Nov. 29, 1966     T. G. SPRAGG ET AL     3,287,841
DISPLAY DEVICE FOR SHOPPING CART
Filed Aug. 16, 1965
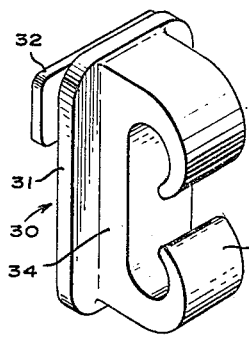
FIG. 7
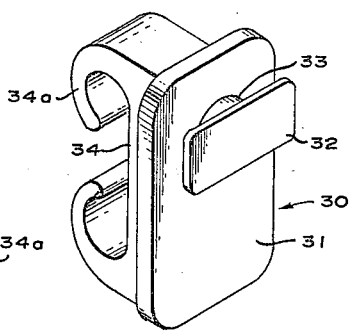
FIG. 8
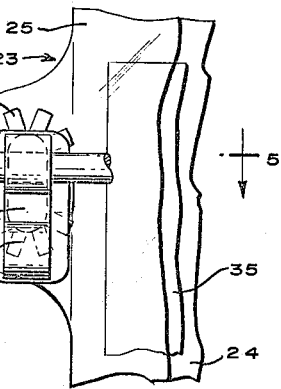
FIG. 3
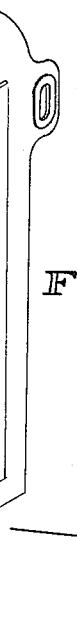
FIG. 6
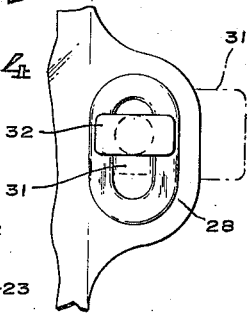
FIG. 4
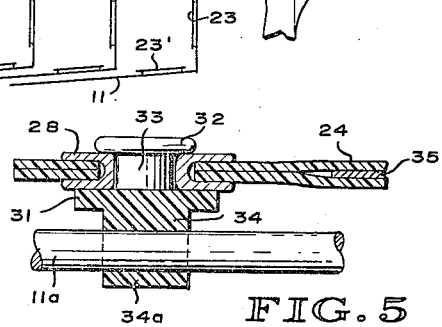
FIG. 2
FIG. 5
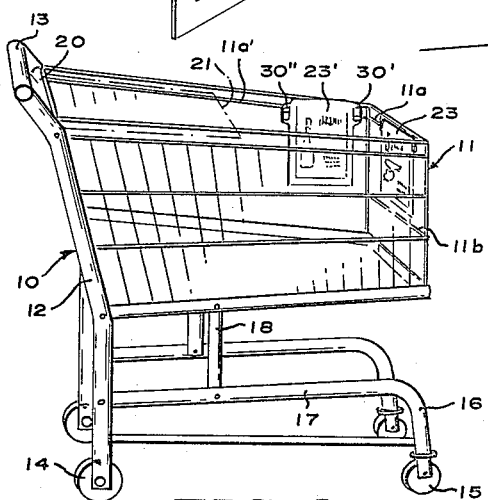
FIG. 1
TERRY G. SPRAGG
LEO J. NOTENBOOM
INVENTOR.
BY *Seed & Berry*
ATTORNEYS

United States Patent Office 3,287,841
Patented Nov. 29, 1966

3,287,841
DISPLAY DEVICE FOR SHOPPING CART
Terry G. Spragg, 1420 Harvard Ave., Seattle, Wash., and Leo J. Notenboom, 12404 NE. 108th, Kirkland, Wash.
Filed Aug. 16, 1965, Ser. No. 479,975
7 Claims. (Cl. 40—308)

The present invention relates to advertising display devices for shopping carts, particularly those of the nesting type having open-mesh baskets, and is a continuation-in-part of our copending application, Ser. No. 374,772, filed June 12, 1964.

In the past shopping carts, as for example those used by customers in a grocery store to carry articles while they are being gathered preparatory to check-out at a cashier station, have sometimes been used to carry advertising placards for products in the store. However, these placards have had to be specially faced to protect the printed material from wear, impact, steam cleaning, and weather, and hence were relatively expensive. Furthermore, the manner of mounting them on the basket of the cart made replacement for new advertising unduly time consuming.

Accordingly, the present invention aims to provide an improved shopping cart display device and means for mounting such device whereby printed paper sheets can be attractively displayed without need for special treatment, and can be easily and quickly applied and removed when desired without need of manipulation of mounting components.

Other more particular objects and advantages of the invention, will, with the foregoing, appear and be understood in the course of the following description and claims, the invention consisting in the novel constructon and in the adaptation and combination of parts hereinafter described and claimed.

In the accompanying drawings:

FIG. 1 is a perspective view of a shopping cart having display devices of the present invention thereon.

FIG. 2 is a schematic plan view illustrating a covey of the shopping carts nested in storage position.

FIGS. 3 and 4 are detail fragmentary elevational views of one of the display devices as viewed, respectively, from outside and inside the basket of the cart.

FIG. 5 is a fragmentary horizontal sectional view taken on line 5—5 of FIG. 3.

FIG. 6 is a perspective elevational view of the envelope component of the display device.

FIG. 7 is a perspective elevational view of one of the mounting clip components of the display device showing the side thereof which snaps onto the basket of the cart; and FIG. 8 is a perspective elevational view of one of the mounting clips illustrating the side thereof which snaps onto the envelope component of the display device.

Referring to the drawings, 10 designates a conventional shopping cart of the nesting type in which the basket 11 cantilevers forwardly from a pair of upright rear supports 12 joined at the top by a handle 13 and having rear wheels 14 at the bottom. Front caster wheels 15 for the cart are mounted at the bottom of legs 16 which are formed at the forward ends of a pair of base arms 17 which are in turn anchored at their rear to the supports 12 and are interconnected with the basket by braces 18.

The two longitudinal side walls and front wall of the basket may be of open-mesh welded-wire construction, and the rear wall is hinged at the top to a cross-piece 20 so as to be free to swing upwardly within the basket as indicated by the phantom line position 21 in FIGURE 1. It will be noted that the longitudinal side walls of the basket converge toward the front wall and that the base arms 17 also converge toward the front. Furthermore, the upper rim of the basket slopes downwardly to the front wall while the bottom wall of the basket slopes upwardly thereto. This described arrangement, as indicated schematically in FIGURE 2, permits a covey of carts 11 to nest end on end with the nose of the basket of each projecting into a rear portion of the basket of the next after pushing up the hinged rear wall thereof. From FIGURE 2 it will be noted that there is a forward zone 22 of each nested basket which is not occupied by the nose of the nest. In accordance with the present invention this zone 22 is utilized to receive one or more advertising display devices 23 to be now described.

Each of the display devices 23 comprises a transparent envelope 24 of a durable plastic material such as polyvinyl chloride of about .220 inch thickness which is formed of two sheets sealed together along the bottom and side edges and open at the top. It is preferred that the front sheet be the crystal clear polished variety of polyvinyl chloride while the back sheet of the envelope is the natural form of polyvinyl chloride as we have found that this arrangement prevents any tendency of the two walls of the envelope to stick together and hence facilitates the insertion and removal of the material from the envelope. A protective flap portion 25 is provided at the top beneath which the envelope is formed with a pair of oppositely extending ears 26 having respective elongated eyelets 27. These eyelets are fitted with relatively rigid grommets 28.

Cooperating with the grommets 28 are plastic mounting clips 30 each having a button 32 on the front connected to the main body 31 of the clip by a stem 33. The button 32 is generally rectangular in shape and has its width extending longitudinally of the clip body 31 and of a dimension slightly less than that of the width of the eyes of the grommets 28. At its back each clip is formed with a bifurcated mounting lug 34 presenting a pair of opposed gripping fingers 34a which hook inwardly and have their tips separated from one another by an entry slot of a width approximating that of the gaps between the finger tips and the outer face of the lug. The material from which the clips 30 are molded is resilient enough to permit the fingers 34a of each clip to be sprung apart from one another and to permit the tip of each finger to be sprung outwardly away from the front face of the clip body.

Conventionally the wire mesh forming the longitudinal side walls and front wall of the basket 11 comprises generally horizontal rods 11a traversed by generally upright cross-wires 11b. In the case of the front wall the rods 11a are truly horizontal whereas in the instance of the side walls these rods, because of the forward convergence of the top and bottom edges of the side walls, have a gentle slope as can be noted by rod 11a' in FIGURE 1. It is the first of these rods 11a and 11a' below the rim of the basket in the forward zone 22 which is preferred for carrying the display device 23.

To mount one of the envelopes 24 on the front wall of the basket 11 of a cart 10, a pair of clips 30 is first fitted onto the envelope grommets 28 by first turning each clip at right angles to one of the grommets as shown by the phantom outline of the clip in FIG. 4, then pushing the clip button 32 forwardly through the grommet eye, and finally twisting the clip ninety degrees to lock the ends of the button behind the longitudinal side edge portions of the grommet. The length of each button stem 33 is made slightly smaller than the thickness of the grommets 28 so that the ends of the buttons will be flexed outwardly and press against the front of the grommets during application of the buttons. In this manner the clips snugly grip the grommets. The clips are then snapped by their fingers 34a over a rod 11a by first pushing the clips rearwardly against the rod to spread the fingers apart if necessary, and by then pushing the clip down to spring the upper of its fingers outwardly and snap-hook the same around the rod. After an advertising sheet 35 is inserted through the open upper end of the envelope the flap 25 is doubled back between the ears 26 so as to be held between the main body of the envelope and the wire members forming the front wall of the basket.

The display devices can be mounted, not only on the front of the basket, but on the forward portions of the rods 11a' of one or both of the longitudinal side walls of the basket which lie in zone 22, this alternative mounting position having been denoted 23' in FIGURES 1 and 2. However, since the rods 11a' slope downwardly toward the front of the cart, and it is preferred not to have the display device 23' tilted, the clip 30' thereon which is at the forward edge is applied with the lower of its fingers snapped over the rod. In this manner the forward clip 30' grips the rod at a lower level than the rear clip 30'. This difference in level of the utilized snap fingers at the front and back edges of the display device 23' substantially compensates for the slope of the rod 11a' on which it is snap-fitted.

To change the advertising sheet 35 of one of the display devices it is only necessary to pull up the protective flap 25 to gain access to the interior of the envelope 24, pull out the old sheet, insert the new sheet, and double back the flap with the envelope remaining mounted on the cart.

Since the display devices are only located in the front zone 22 of the related basket 11 they cannot be dislodged during nesting of the carts. Choice of a durable flexible transparent plastic material such as polyvinyl chloride for the envelope sheeting assures long life for the envelope 24 even though subject to steam cleaning with the cart, various weather conditions, impact and wear from articles loaded into the related basket, and permits the advertising sheets 35 to be printed inexpensively on standard paper stock without need of addition of a protective coating. The advertising sheets can be printed on both sides since they can be viewed through the mesh of the basket as well as from the inside of the basket.

It is believed that the invention will have been clearly understood from the foregoing detailed description of our now-preferred illustrated embodiment. Changes in the details of construction may be resorted to without departing from the spirit of the invention and it is accordingly our intention that no limitations be implied and that the hereto annexed claims be given the broadest interpretation to which the employed language fairly admits.

We claim:

1. A display device comprising, an envelope with a transparent side for revealing a display carried within the envelope and having a pair of oppositely extending ears each with an elongated eyelet having a relatively rigid rim, and a pair of mounting clips each presenting an elongated button spaced by a reduced stem from the rest of the clip and adapted to be inserted through a respective said eyelet when the length of the button coincides with the length of the eyelet and to lock the clip onto the eyelet when the clip is then turned to locate the length of the button at cross-angles with the length of the eyelet, said clips also having respective rod gripping means each comprising a pair of opposed spaced snap fingers which project from the opposite side of the respective clip from its said stem and hook inwardly to selectively grip a rod located therebetween.

2. A display device comprising, an envelope with a transparent front side for revealing a display carried within the envelope and having at opposite ends thereof a pair of oppositely extending coplanar ears each with an elongated front-to-back eyelet having a relatively rigid rim and extending generally parallel to the respective said end of the envelope, and a pair of mounting clips each presenting on one side thereof an elongated button spaced by a reduced stem from the rest of the clip and adapted to be inserted through a respective said eyelet when the length of the button coincides with the length of the eyelet and to lock the clip onto the eyelet when the clip is then turned to locate the length of the button at cross-angles with the length of the eyelet, said clips also having respective rod gripping means extending from the opposite side thereof from said buttons.

3. A display device according to claim 2 in which said ears are integral extensions of said envelope and have their eyelet rims stiffened by respective stiff grommets gripping the ears.

4. In combination, a given cart with a given tapered forwardly-projecting open-mesh wire basket adapted to have a front portion of the length of the basket of a like cart nested for compact storage within the rear portion of said given basket, the front wall of said given basket presenting a horizontal rod, and an advertising device comprising an upright envelope with a transparent side exposed to the inside of said given basket for revealing a removable display in the envelope, said envelope having an upper closure flap normally doubled back to occupy a position between the body of the envelope and said front wall of the given basket, said flap being adapted to be withdrawn from said normal position to give access to a display in said envelope, and said envelope having a pair of oppositely projecting coplanar integral ears with respective vertically elongated eyelets overlying and facing said horizontal rod and each having a relatively rigid rim, and a pair of detachable mounting clips detachably interfitting with the rims of said eyelets and gripping said horizontal rod.

5. The combination of claim 4 in which each of said clips has a pair of opposed snap fingers on the rod facing side thereof for gripping said rod.

6. A display device comprising, an envelope with a transparent front side for revealing a display carried within the envelope and having a pair of oppositely extending ears each with a front-to-back eyelet having a relatively rigid rim, and a pair of mounting clips each having means projecting from one side thereof detachably interfitting with the rim of said eyelets and each having a pair of opposed snap fingers projecting from the other side thereof for gripping a rod extending between said ears behind said envelope.

7. A display device comprising, a rectangular polyvinyl envelope with a doubled back access flap at the top and having a transparent front wall for revealing a display carried within the envelope, and a pair of alined integral coplanar mounting ears projecting oppositely from the envelope in spaced relationship to the ends of the flap, each of said ears having a front-to-back eye elongated in the top-to-bottom direction of the envelope and a pair of stiff grommets gripping said ears and forming rigid rims for said eyes to receive mounting clips.

References Cited by the Examiner
UNITED STATES PATENTS

| | | | |
|---|---|---|---|
| 303,448 | 8/1884 | Murphy | 40—11 |
| 1,881,371 | 10/1932 | Gilbert | 40—10 X |
| 2,066,957 | 1/1937 | Wratschko | 24—73 |
| 2,411,368 | 11/1946 | Dow | 40—10 X |
| 2,728,259 | 12/1955 | Poupitch | 24—221 X |
| 3,116,526 | 1/1964 | Cochran | 24—221 X |

EUGENE R. CAPOZIO, *Primary Examiner.*

W. GRIEB, *Assistant Examiner.*